No. 720,047. PATENTED FEB. 10, 1903.
W. MICHALK.
LUBRICATING PRESS.
APPLICATION FILED AUG. 22, 1899.
NO MODEL.
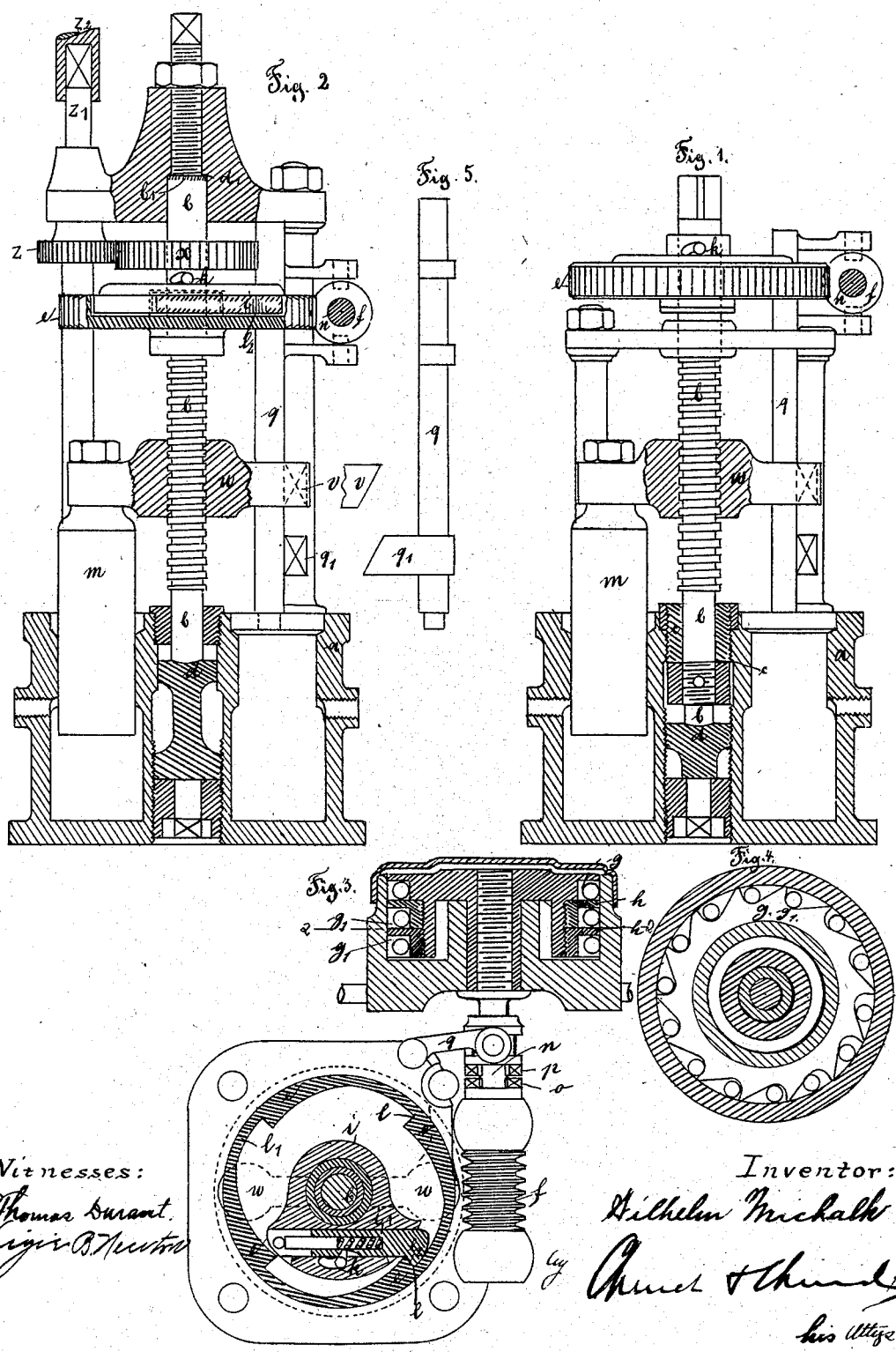

UNITED STATES PATENT OFFICE.

WILHELM MICHALK, OF DEUBEN, NEAR DRESDEN, GERMANY.

LUBRICATING-PRESS.

SPECIFICATION forming part of Letters Patent No. 720,047, dated February 10, 1903.

Application filed August 22, 1899. Serial No. 728,119. (No model.)

*To all whom it may concern:*

Be it known that I, WILHELM MICHALK, a subject of the King of Saxony, residing at Deuben, near Dresden, Saxony, Germany, have invented certain new and useful Improvements in or Relating to Lubricating-Presses, (for which applications for Letters Patent have been made in Germany, dated July 4, 1899; in Germany, (patent of addition,) dated July 7, 1899; in Austria, dated July 24, 1899; in France, dated July 24, 1899; in Belgium, dated July 31, 1899, and in Great Britain, dated August 5, 1899, No. 16,081,) of which the following is a specification.

This invention relates to improvements in lubricating-presses in which one or more pressure-pistons are actuated by a screw-spindle, and if several pressure-pistons be employed they are worked jointly by the said screw-spindle.

The object of these improvements is to increase the duration of such lubricating-presses and to improve the reliability of their action.

In the drawings, Figure 1 is a vertical sectional view of a press constructed in accordance with the present invention. Fig. 2 is a similar view of a modified form of construction. Fig. 3 is a horizontal sectional detail view showing the mechanism for operating the screw-spindle of the press. Fig. 4 is a sectional view of one of the ratchet drive-wheels. Fig. 5 is a detail view of the trip-lever.

Similar letters of reference in the several figures indicate the same parts.

By arranging the bearing and counterbearing $c$ for the working screw-spindle $b$ in the cylindrical body or casing $a$, as shown in Fig. 1, a compact construction of press is obtained which takes up but little space and permits of its use in places where heretofore it has not been possible, owing to want of space. Moreover, by the arrangement of the counterbearings $d$ and $d'$, provided on the faces of the working screw-spindle $b$, (see Figs. 1 and 2,) the friction-surfaces are limited to the smallest possible amount in order to obtain an easy rotation of the working screw-spindle $b$. Mounted loosely on suitable bearings on the screw-spindle $b$ is a worm-wheel $e$, driven by a worm $f$, carried by the shaft $n$, power being transmitted to the spindle $b$ from the worm-wheel $e$ by mechanism hereinafter described.

In order to compensate for wear on the spindle $b$ and in order that the worm-wheel $e$ and worm $f$ be kept accurately in mesh, the bearings $c$, $d$, and $d'$ at the ends of the spindle are made adjustable, so that the spindle may be readily adjusted, even during the working of the apparatus, as will be readily understood. In order that also in this improved device the cylinders can be filled, a toothed disk or wheel $x$ is mounted on the screw-spindle $b$, which wheel or disk $x$ gears with a wheel $z$, the latter being firmly mounted on a shaft $z'$, passing through the head, and upon this shaft a crank $z^2$ is secured by means of which the up-and-down movement of the pressure-pistons is effected by hand, this operation being necessary, especially for filling the cylinders.

Instead of using single spherical ratchet-wheels, which are liable to cause irregularities in the working of lubricating-presses, owing to teeth breaking off occasionally, thus rendering the wheels unfit for use, in the improved device spherical ratchet-wheels are used which consist of several such wheels $g$ and $g'$, Figs. 3 and 4, so connected as to form one, acting jointly upon one shaft, the object being to insure a reliable action, even if a tooth should break or a ball be ruptured, and the object of the partitions $h$, provided between the teeth, is to prevent any fragments that may have collected in one chamber from entering another chamber. The wheel thus works in a most reliable manner, seeing that the function of the other chambers or compartments is not interfered with.

Fixed upon the screw-spindle $b$ and lying within the worm-wheel $e$ is a block $i$, in an enlarged portion of which works a spring-pressed bolt $i'$, the spring normally holding the bolt projected and in contact with the inner edge of the wheel $e$, thus holding the wheel and spindle fast together. In order to insure the bolt $i'$ being held in contact with the worm-wheel $e$, the bolt is provided with a nose or hooked end $l^2$, which engages with one of a series of teeth or projections $l$, formed on the inner edges of the wheel $e$, as will be readily understood.

In order that for filling the cylinder the bolt $i'$ may be uncoupled, the screw-spindle $b$ is slightly turned in the opposite direction, whereby the nose $l^2$ is thrown out of engagement with the projection $l$, whereupon then the bolt can be moved back by turning the pawl or catch $k$ sidewise.

In order to prevent the pressure piston or pistons $m$ from exceeding a given lowest point or level and from moving right down to the bottom of their cylinders, which would result in the destruction of or damage to the working mechanism, a clutch-coupling, Figs. 2 and 3, is arranged upon the worm-shaft $n$, one part $o$ of this coupling being firmly connected with the worm $f$, which is mounted to turn loosely on shaft $n$, while the other part $p$ is loosely mounted on the shaft, so as to be movable in the axial direction, but not to turn on the same. When, therefore, the clutch-coupling is closed, the motion of the ratchet-wheel will be communicated to the worm-shaft, as will be readily understood. For opening and closing the coupling a two-armed lever $q$, Figs. 2, 3, and 5, is provided, the fork-shaped lever-arm of which engages with the movable portion $p$ of the clutch. The other lever-arm, $q'$, extends, with its inclined or beveled end, into the path of movement of a projection $v$, which is arranged on the pressure-piston or on its support or crosshead $w$, connecting the same with the working screw-spindle. When the piston has reached the lowest admissible point, the projection $v$ acts upon the beveled end of the lever-arm $q'$, that the lever is thereby rotated in the direction necessary to open the clutch-coupling. When the coupling is opened, the worm-shaft $n$ and likewise the mechanism for working the lubricating-presses are brought to a standstill.

I claim—

1. In a lubricating-press the combination with the screw-spindle carrying the pressure-piston, of the adjustable bearings, bearing centrally against the opposite ends of the spindle, and mechanism for operating the spindle; substantially as described.

2. In a lubricating-press, the combination with the screw-spindle carrying the pressure-piston, of the bearings in which the spindle is journaled, and adjustable counterbearings bearing centrally against the opposite ends of the spindle, whereby the spindle may be adjusted to take up wear, and mechanism for operating the spindle; substantially as described.

3. In a lubricating-press the combination with the screw-spindle, the pressure-piston carried thereby, the adjustable step-bearings for the spindle at each end thereof, the worm-wheel mounted on said spindle below the upper step-bearing and the worm engaging said worm-wheel; substantially as described.

4. In a lubricating-press, the combination with the screw-spindle, the pistons operated thereby, the worm-wheel on said spindle, the worm for driving said worm-wheel, the shaft on which said worm is loosely mounted, the clutch member longitudinally movable on the worm-shaft for engaging said worm, the rotatable rod carrying the arm engaging the movable member of the clutch on the worm-shaft, the extension on the rotatable rod, and the coöperating extension moving in unison with the pistons adapted to strike the extension on the rod whereby the rod will be turned and the clutch opened and the descent of the pistons stopped, substantially as described.

In testimony whereof I have hereto set my hand in the presence of the two subscribing witnesses.

WILHELM MICHALK.

Witnesses:
HERNANDO DE SOTO,
CH. AUGUST DUMMER.